H. HELMHOLTZ & C. C. BERTRAM.
MECHANISM FOR OPERATING VALVE GEAR OF LOCOMOTIVES.
APPLICATION FILED MAR. 15, 1915.
1,208,554.
Patented Dec. 12, 1916.
3 SHEETS—SHEET 1.
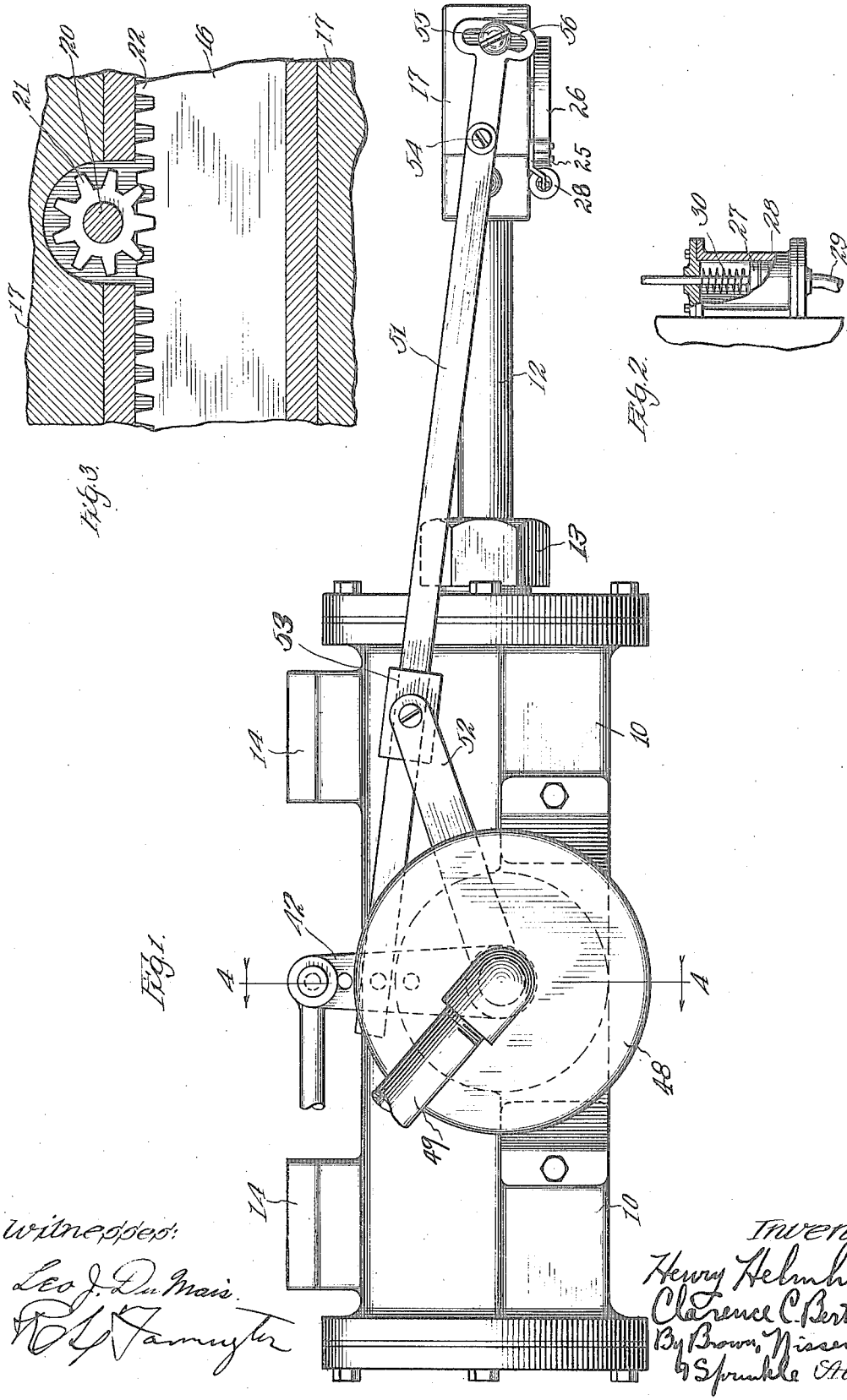

H. HELMHOLTZ & C. C. BERTRAM.
MECHANISM FOR OPERATING VALVE GEAR OF LOCOMOTIVES.
APPLICATION FILED MAR. 15, 1915.
1,208,554.
Patented Dec. 12, 1916.
3 SHEETS—SHEET 2.
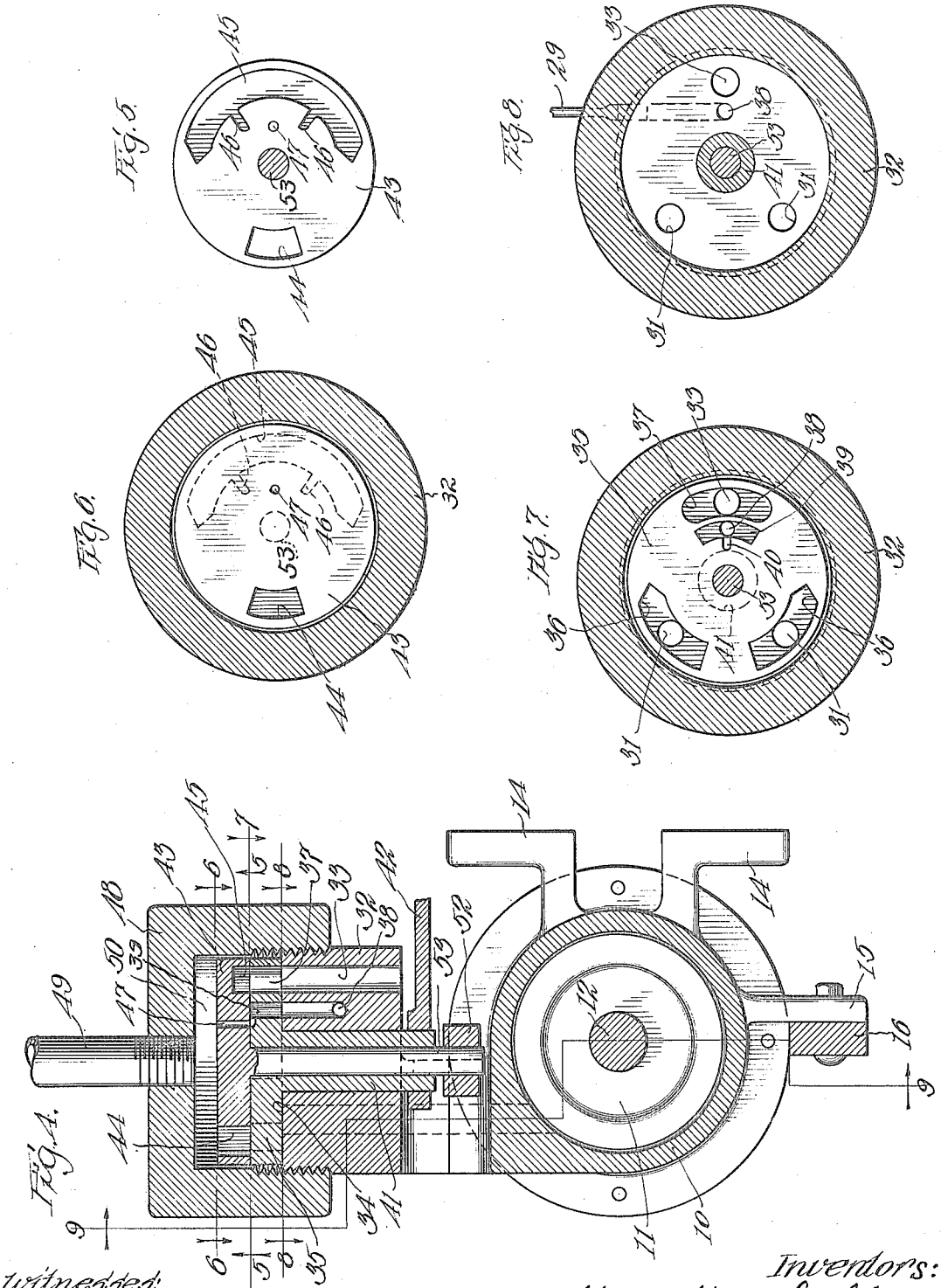

H. HELMHOLTZ & C. C. BERTRAM.
MECHANISM FOR OPERATING VALVE GEAR OF LOCOMOTIVES.
APPLICATION FILED MAR. 15, 1915.
1,208,554.
Patented Dec. 12, 1916.
3 SHEETS—SHEET 3.
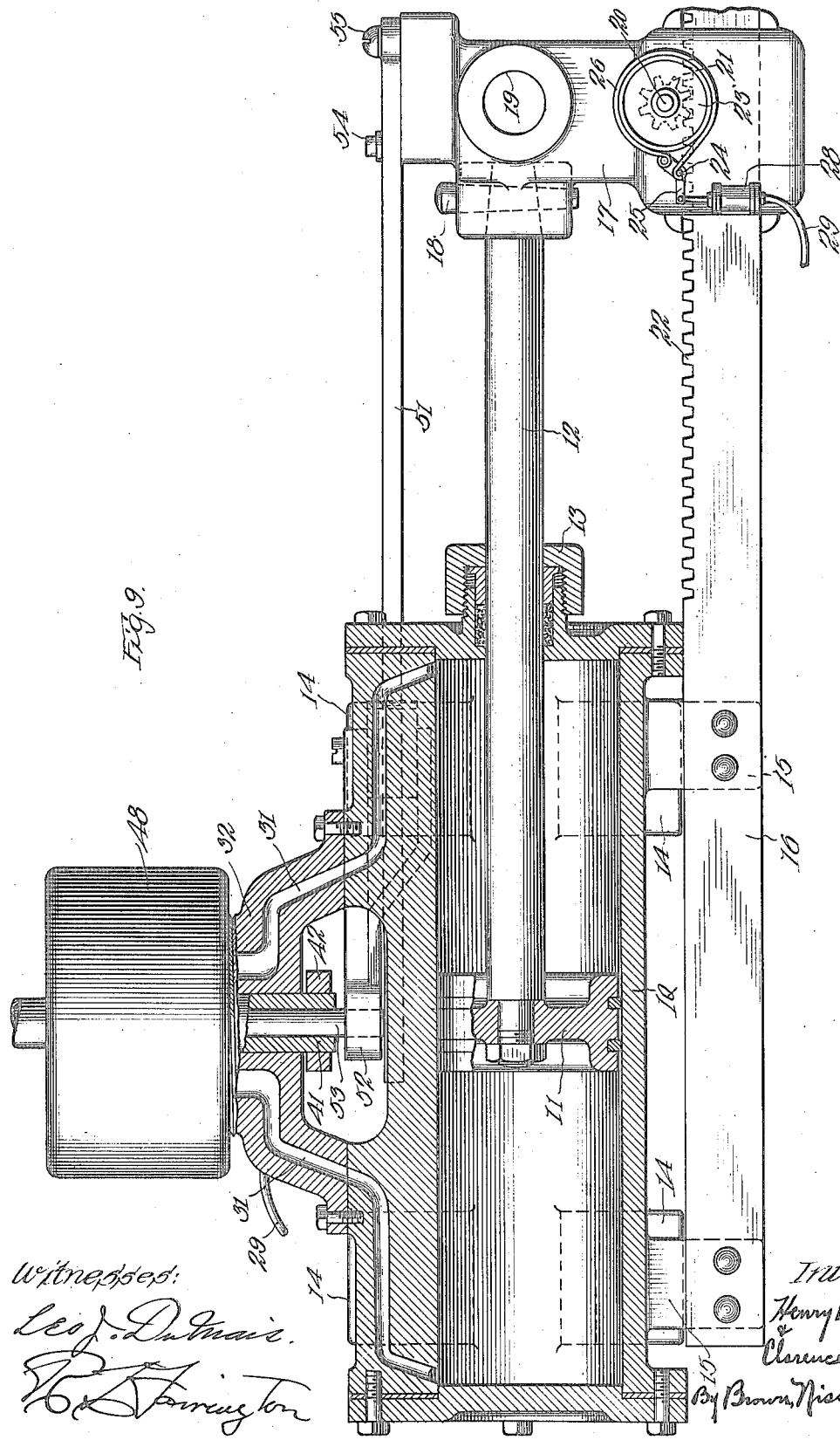

UNITED STATES PATENT OFFICE.

HENRY HELMHOLTZ AND CLARENCE C. BERTRAM, OF CHICAGO, ILLINOIS.

MECHANISM FOR OPERATING VALVE-GEAR OF LOCOMOTIVES.

1,208,554.  Specification of Letters Patent.  Patented Dec. 12, 1916.

Application filed March 15, 1915. Serial No. 14,304.

*To all whom it may concern:*

Be it known that we, HENRY HELMHOLTZ and CLARENCE C. BERTRAM, citizens of the United States, and residing at Chicago, in the county of Cook and State of Illinois, have invented a new and useful Improvement in Mechanisms for Operating Valve-Gear of Locomotives, of which the following is a specification.

Our invention relates to mechanism for operating valve gears of locomotives, and the like, and has for its object the provision of simple and efficient means adapted to be connected to the valve gear of an engine or locomotive and operated by a fluid under pressure, such as compressed air or steam, for operating and controlling said valve gears. Other objects will appear hereinafter. The invention consists in substantially the combinations and arrangement of parts hereinafter described, shown in the accompanying drawings forming a part of this specification and more specifically set forth in the appended claims.

In the drawings,—Figure 1 is a plan view of a device embodying our invention. Fig. 2 is an enlarged fragmental view of a locking means used in the construction. Fig. 3 is an enlarged fragmental section of a rack and pinion movement used in the construction. Fig. 4 is a section taken on line 4—4 of Fig. 1. Fig. 5 is a bottom view of a valve used in the construction and taken as looking from line 5—5 of Fig. 4; and Figs. 6, 7, 8, and 9 are sections taken on line 6—6, 7—7, 8—8, and 9—9 respectively of Fig. 4.

In locomotives, and especially those of large types, a great amount of force is required to operate the valve gear to reverse the travel of the locomotive. Ordinarily a large manually operable lever is mounted conveniently to the engineer and connected with the valve gear for controlling the latter. It is our purpose to provide a compressed fluid operable means secured to a convenient portion of the locomotive and suitably connected with the valve gear for operating said gear, the fluid supply being provided with suitable throttling means for controlling the gear-operating means.

We preferably provide a fluid operable means giving a reciprocal movement such as a working cylinder 10 having a piston 11 reciprocally mounted therein, with its piston rod 12 extending through a packing gland 13 at one end of the cylinder 10. The cylinder is provided with feet 14 by means of which it may be secured to a locomotive or other desired object for supporting the device.

On the cylinder are provided arms 15 upon which is mounted a guide bar 16. The guide bar 16 extends beyond one end of the cylinder and mounted on the extended end is a crosshead 17. Said crosshead is secured to the piston rod 12 by means of a pin 18 or any other suitable means. The crosshead is provided with an opening 19 therethrough for connection with the valve gear of a locomotive, such valve gear is not shown since it forms no part of this invention.

On the crosshead 17 we provide a locking means for locking the crosshead in desired positions. This locking means may be any desirable means, but we preferably use the device shown which is operated by a compressed fluid such as steam or air. The lock comprises a shaft 20 journaled in the crosshead 17 and having a pinion 21 fixed on the shaft and meshing with gear teeth 22 formed on the guide rod 16. The shaft 20 extends beyond the crosshead 17 and is provided on the extended end with a brake drum 23. Adjacent the brake drum 23 on the crosshead 17 is a pin 24 upon which is mounted an angular lever 25 one end of which is connected to a brake band 26 which extends around and coöperates with the brake drum 23. The other end of the brake band is secured to a pin 24, so that upon operation of lever 25 the brake band will be clamped around the brake drum. As a means for operating the lever 25, we provide a piston 27 mounted in a cylinder 28 and operated by compressed fluid, the latter being transmitted to the cylinder through a pipe 29. Above the piston 27 we provide a compression spring 30 to release the brake band from the drum upon the fluid being cut off and exhausted from the cylinder 28.

At each end of the cylinder 10, is a passage 31 both of which open into a valve casing 32. The passages 31 also open into cylinder 10 in the usual manner in which such passages open in an ordinary steam engine in order to cause exhausting and operation of the device. The valve casing 32 is also provided with a port 33 which is used for a common exhaust port for the device. On the inner side of the valve casing 32 is a surface 34 adapted to coöperate with a valve 35. The valve 35 is provided with two openings 36 which are adapted to coöperate with the passages 31. The valve 35 is also provided with an opening 37 which coöperates with the exhaust port 33. The openings 36 and 37 are of such sizes that the ports 31 and 33 are never covered by the valve 35. The valve casing 32 is also provided with an opening 38 which connects with the pipe 29 connected with the cylinder 28. The valve 35 is provided with an opening 39 which is sufficiently large to never close off the opening 38 in the casing 32. Near the central portion of the opening 39 is a recess 40 considerably smaller than opening 39 and leading into the latter. On the lower side of valve 35 is a stem 41 which reaches through valve casing 32 and is provided with a manually operable lever 42 which has a suitable connection, not shown, extending to a position convenient for use of the engineer in operating the device.

Mounted on the upper side of valve 35 is a valve 43. The valve 43 is provided with an opening 44 extending therethrough of a size corresponding to the distance between the edges of the openings 36 in the valve 35. The valve 43 is also provided with a recess 45 which is of a length to almost reach the remote ends of openings 36 in valve 35 so that the short distances between the adjacent ends of recess 45 and the remote ends of openings 36 when valves 43 and 35 are in operative positions, such space will serve as a lap preventing the flow of liquid through the valves. The recess 45 is provided with two small recesses 46 leading therefrom and positioned so that their adjacent edges are slightly spaced from the ends of opening 39 in the valve 35. The small spaces at the ends of said opening 39 serve as a lap to prevent the flow of fluid from said opening to the recess 46. The valve 43 is also provided with a small opening 47 which is adapted to register with the recess 40 in valve 35 when the valves 43 and 35 are in normal positions. The valve casing 32 is provided with a cap 48 covering the valves 35 and 43. Said cap is provided with a pipe 49 which extends to a suitable supply of fluid, not shown.

The crosshead 17 is provided with an arm 51 adjustably secured thereto and a lever 52 is provided with a sliding member 53 and the latter slidably mounted on arm 51. The lever 52 is secured to a stem 53 which passes through the stem 41, and either formed integrally with or secured to valve 43 in order to cause movement of said valve upon movement of lever 52. The arm 51 may be secured rigidly to crosshead 17 or it may be secured thereto by means of screws 54 and 55, the latter passing through a slot 56 in the arm 51 so that the arm may be adjusted to different angular positions with respect to the crosshead 17 in order to cause greater or less movement of the lever 52 upon reciprocation of the crosshead. Thus, by varying the angularity of arm 51, the valve 43 may be made to overtake the valve 35 at a sooner or later time as desired.

In operation, the pipe 49 is connected to a suitable source of compressed fluid supply such as air or steam, and the opening 19 of the crosshead connected to the valve gear of the locomotive or other engine. The fluid on entering the chamber 50 in the valve casing, passes through the opening 47 into groove 40 and thence through opening 39 into passage 38 and through pipe 29 into cylinder 28 to move the piston 27 to lock the brake band 26 on the brake drum 23. This locking of the brake drum 23 causes the crosshead 17 to be locked on the guide bar 16, thus preventing movement of the valve gear when the device is in normal condition. Upon changing the direction of travel of the locomotive, the engineer moves the manually operable lever 42 in the opposite direction to which he wishes the locomotive to travel. This movement of lever 42 moves valve 35 correspondingly and this movement permits opening 44 in valve 43 to register with one of the openings 36 in valve 35 and allows the fluid to pass into one end of the cylinder 10 to cause operation of the piston 11, thereby moving the valve gear in a corresponding direction. The movement of the piston and crosshead 17 causes arm 51 to move lever 52 and cause valve 43 to overtake valve 35 and restore the valves 43 and 35 to their normal relative positions. Upon movement of the valve 35, the recess 40 was moved out of registration with opening 47 and permitted one end of the opening 39 to register with one of the recesses 46, thereby automatically cutting off the supply of fluid to the cylinder 28 and permitting the fluid which was in the cylinder to be exhausted out through openings 38 and 39 and recesses 46 and 45 through the common exhaust 33. This relieving the cylinder 28 permits spring 30 to relieve the brake drum 23 of the brake band 26, permitting freedom of movement of the crosshead on the guide 16. Upon the valve 43 again overtaking valve 35, in its movement, the opening 39 moves out of registration with the recesses 46, and the opening 47 again registers with groove 40, permitting the fluid to again enter the cylinder 28 to again lock the crosshead against movement. This again locks the link gear mechanism in its new position of adjustment. The amount of throw given lever 42 determines the amount of travel of the piston 11 and the crosshead 17, since upon moving valve 35 to any desired position, fluid is introduced in the cylinder to move the piston and the movement of the piston causes arm 51 and lever 52 to move the valve 43 until it again reaches its normal relative position to valve 35. This automatically cuts off the supply of fluid to the cylinder 10 and permits the flow of the fluid to cylinder 28 to again lock the device. It will be seen that in moving the lever 42 in either direction, the piston will be moved correspondingly, both as to direction and degree of movement.

While we have illustrated and described the preferred form of construction, we do not wish to be limited to the precise details set forth, but desire to avail ourselves of such variations and changes as come within the scope of the appended claims.

We claim:

1. In combination, a working cylinder; a piston in said cylinder; a crosshead; a piston rod connected between the piston and crosshead; a valve connected with the cylinder for controlling the operation of the piston; a rod pivoted near one end to the crosshead and having a slot therein concentric with its pivotal connection; a screw passing through the slot and threaded in the crosshead for locking the rod at different angles to the crosshead; and an operative connection between the rod and the valve.

2. In combination, a working cylinder; a piston in the cylinder; a piston rod connected with the piston; a guide having rack teeth thereon; a crosshead slidably mounted on the guide and connected with the piston rod; a pinion pivotally mounted in the crosshead and meshing with the rack teeth; a friction drum connected to rotate with the pinion; a friction band coöperating with the friction drum; a cylinder; a piston in the last mentioned cylinder and connected with the friction band for moving the latter into operative connection with the friction drum; and valves connected with said cylinders for controlling the operation of said pistons.

3. In combination, a working cylinder; a piston in the cylinder; a guide having rack teeth thereon; a cross-head mounted on the guide; a shaft journaled in the crosshead; a pinion on said shaft and meshing with the teeth of the guide; a friction-drum on said shaft; a friction-band on said drum; a fluid-operable means connected with the band; a piston-rod connecting the piston with the cross-head; a valve connected with the cylinder and said fluid-operable means; and a connection connecting the cross-head with the valve.

4. In combination, a working cylinder; a piston in the cylinder; a guide having rack teeth thereon; a cross-head mounted on the guide; a piston rod connecting the piston with the crosshead; a shaft journaled in the crosshead; a pinion on the shaft meshing with the rack teeth; a friction drum on the shaft; a friction band around the drum; a compressed fluid supply; valves connected with the fluid supply and the cylinder for controlling the supply of fluid to the cylinder; a cylinder connected with the valves; a piston in the second mentioned cylinder; a piston rod connecting the second mentioned piston with the brake band; and a spring pressing on the second mentioned piston normally holding the brake band out of operative engagement with the brake drum and adapted to yield when fluid is fed into the second mentioned cylinder for moving the brake band into operative engagement with the drum.

In testimony whereof we have signed our names to this specification, in the presence of two subscribing witnesses, on this 10th day of March, A. D. 1915.

HENRY HELMHOLTZ.
CLARENCE C. BERTRAM.

Witnesses:
WALTER SCHRAEDER,
M. T. HACKLEY.